Sept. 20, 1966    C. W. KINSLEY    3,273,593
TIMER MECHANISM
Filed Aug. 26, 1964    3 Sheets-Sheet 1

INVENTOR.
CHARLES W. KINSLEY
BY
Hood, Gust & Irish
Attorneys

Sept. 20, 1966  C. W. KINSLEY  3,273,593
TIMER MECHANISM
Filed Aug. 26, 1964  3 Sheets-Sheet 2

INVENTOR.
CHARLES W. KINSLEY
BY
Hood, Gust & Irish
Attorneys

Sept. 20, 1966  C. W. KINSLEY  3,273,593
TIMER MECHANISM
Filed Aug. 26, 1964  3 Sheets-Sheet 3

INVENTOR.
CHARLES W. KINSLEY
BY
Hood Gust & Irish
Attorneys

United States Patent Office 3,273,593
Patented Sept. 20, 1966

3,273,593
TIMER MECHANISM
Charles W. Kinsley, Indianapolis, Ind., assignor to Glass Machinery Inc., Indianapolis, Ind., a corporation of Indiana
Filed Aug. 26, 1964, Ser. No. 392,143
13 Claims. (Cl. 137—624.17)

The present invention relates to timer mechanism and more particularly to coordinated mechanism for dominating the actuation of a plurality of fluid-actuated devices. The primary object of the invention is to provide a mechanism which, as a whole, may be driven either directly from a complex machine including a number of such fluid-actuated devices, or from a separate power source suitably synchronized with the main machine drive, the timer mechanism including a plurality of identical modules, one for each fluid-actuated device, each of said modules being capable of controlling its associated fluid-actuated device through a double-acting cycle in any predetermined time relation with respect to the other fluid-actuated devices in the machine and each module being accurately and infinitely adjustable, during operation of the machine and independently of any other module, with respect to actuation of its controlled device in each direction.

A further object of the invention is to provide, in such a timer mechanism, a bank of such modules physically associated with, and fed from, a common manifold continuously in communication with a source of fluid under pressure, said bank including a number of modules exceeding the number of fluid-actuated devices to be controlled, together with quick coupler means whereby the lines serving any fluid-actuated device may be quickly shifted from one module to a spare module with a minimum of machine down-time.

Still another object of the invention is to provide, in such a timer mechanism, means whereby any module may be easily and quickly removed from a bank, without disturbing any other module, and may be replaced by an identical module, such means including structural features whereby the module newly introduced to the bank will be automatically timed to correspond precisely to the timing of the replaced module.

A further object of the invention is to provide novel pilot valve structure for use in such a module.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

In a hollow glassware forming machine, for instance, there are many fluid-actuated devices, some of which are double-acting, for controlling the positions and movements of the several operating parts of the machine, and each of those parts must be shifted first in one direction and then in an opposite direction within each cycle of the machine, in accurately-timed relation to the movements of the other operating parts of the machine. With known types of timer mechanisms, it is difficult to establish a proper relationship among the several fluid-actuated devices and to maintain that relationship; and in case of failure of the control for any such device, the whole machine must be shut down for a considerable period of time to permit removal and repair or replacement of that control. In the case of most timer mechanisms heretofore known to me, furthermore, it is not possible to adjust the phase of any control relative to the other controls in the machine, during operation of the machine. These and other disadvantages of timer mechanisms heretofore known to me are overcome by the timer mechanism of the present invention.

Of course, there are many other types of machines in which timer mechanism of the character herein disclosed will be equally useful; and it is to be understood that the present disclosure is not all limited with regard to the type of machinery to be controlled thereby. For simplicity of disclosure, I have illustrated and will describe my new timer mechanism for use in pneumatic systems; but it will be readily recognized that the mechanism is equally applicable to hydraulic systems. In this connection, it will be understood that references in the present disclosure, and in the appended claims, to "exhaust" are intended broadly enough to include not only discharge to the atmosphere in a pneumatic system but also discharge to a return line or reservoir in a hydraulic system.

Figure 2:
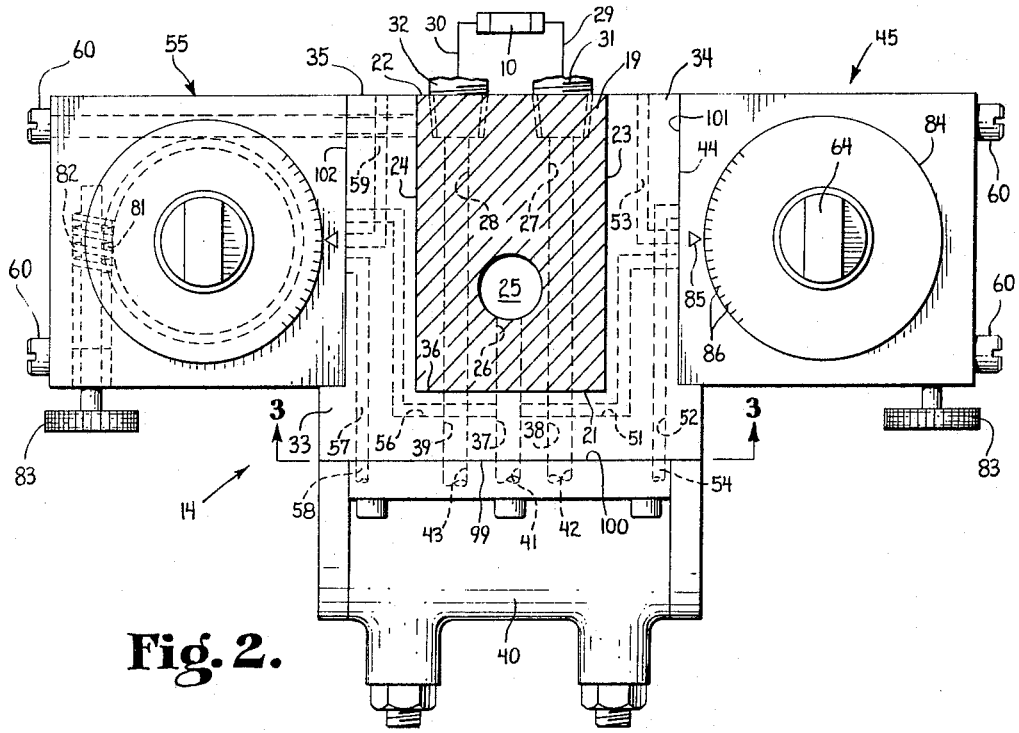
FIG. 2 is a horizontal section taken substantially on the line 2—2 of FIG. 1 and drawn to an enlarged scale.
Figure 3:
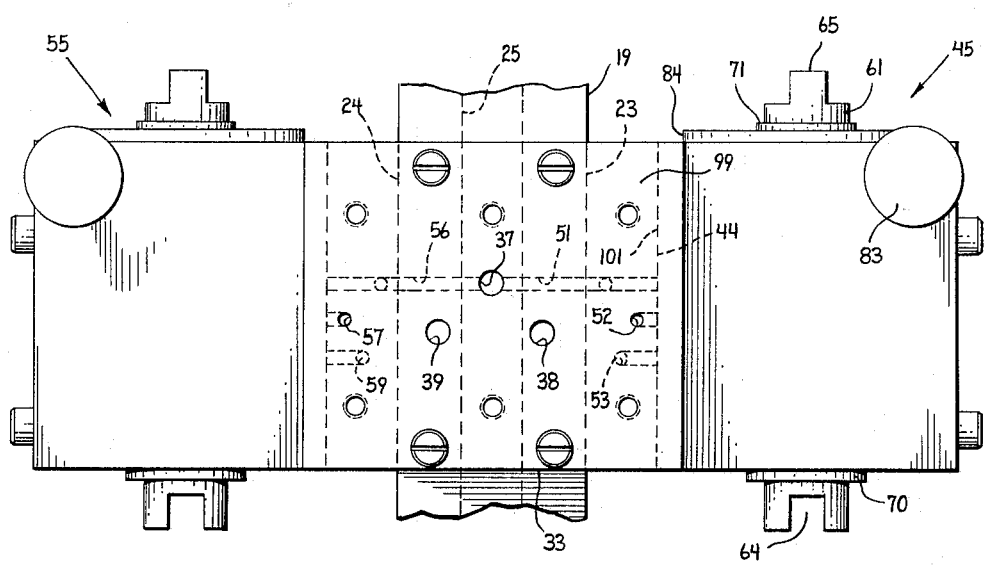
FIG. 3 is a front elevational view of the module illustrated in FIG. 2.

Also for simplicity of illustration, I have made no effort to illustrate a plurality of fluid-actuated devices to be controlled; but in FIG. 2, I have somewhat diagrammatically suggested one double-acting fluid-actuated device 10 to be controlled by a single module.

Figure 1:
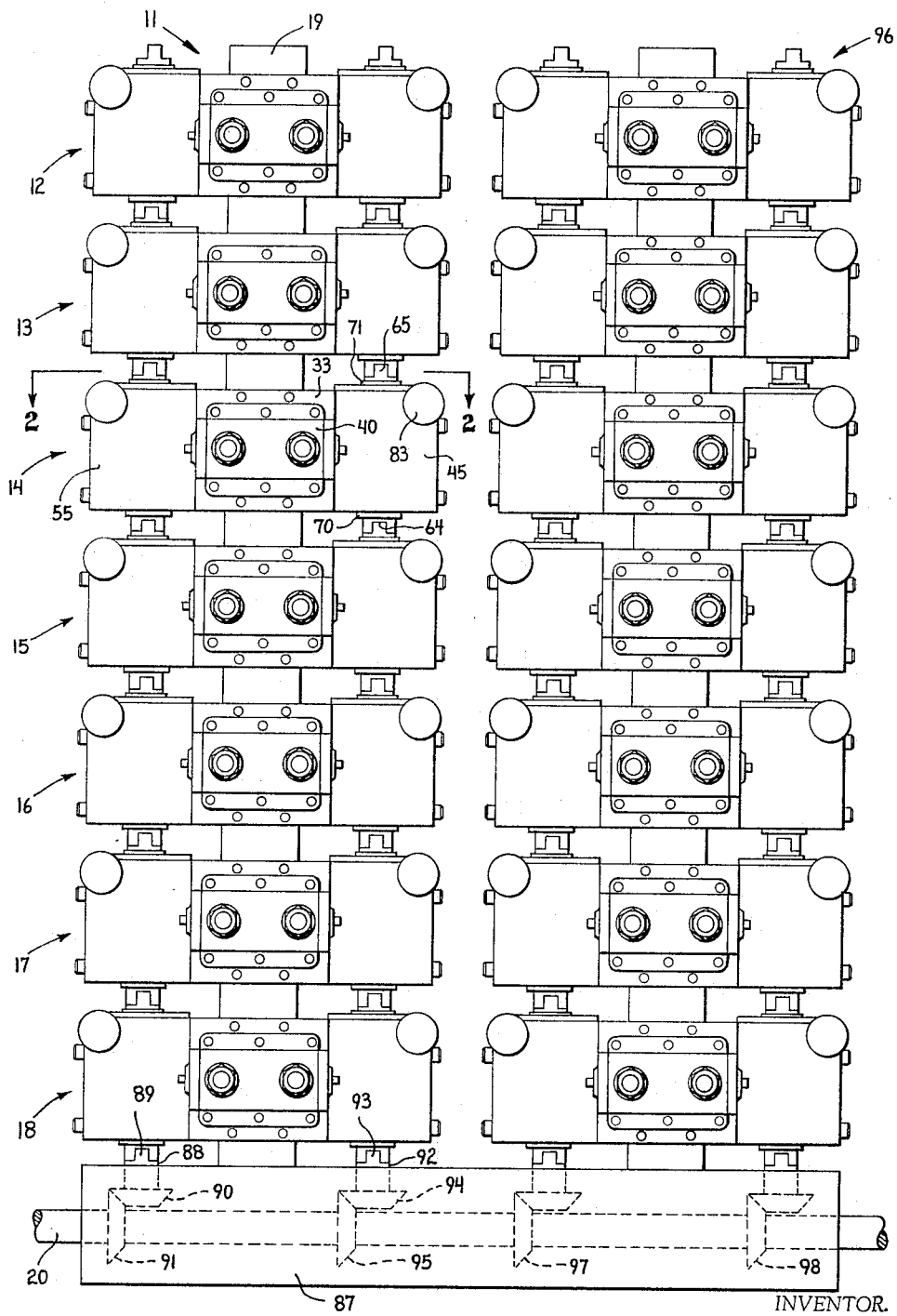
FIG. 1 is an elevational view showing two banks of modules arranged in parallel upon equivalent manifolds, and indicating drive means therefor, all in accordance with the present invention.

In FIG. 1, I have illustrated a bank 11 of timer modules 12, 13, 14, 15, 16, 17 and 18 all mounted in cooperative association with a common manifold 19. Said manifold, in turn, is mounted near a drive shaft 20 through which, as will be explained, the pilot valves of the several modules are driven in unison. Each of the several modules occupies its individual station upon the manifold 19, and under normal conditions the module 15 is blank, while each of the other modules is operatively connected, in a manner to be described, to its individual fluid-actuated device such as that indicated at 10 in FIG. 2.

At each such station, the manifold 19 is formed with a first wall 21 which is preferably flat and so constructed as to provide for a fluid tight association of a module face therewith. At each station, the manifold is formed with a second wall 22 opposite the wall 21 and with third and fourth walls 23 and 24 joining the walls 21 and 22. A continuous chamber 25 extends throughout the length of the manifold 19, passing all of the above-mentioned stations.

At each station, the manifold is formed with an open passage 26 leading from the chamber 25 and opening through the manifold wall 21. At each station, the manifold is further formed with parallel open passages 27 and 28 completely penetrating the manifold and opening through the walls 21 and 22. Flexible conduits 29 and 30 connect the opposite ends of a device 10 respectively with the passages 27 and 28 through quick couplers 31 and 32.

Each module comprises a body block 33 formed to provide separated, spaced legs 34 and 35 proportioned and designed to straddle the manifold walls 23 and 24 at its respective station; and each body block is formed, between its legs 34 and 35, with a face 36 designed for fluid sealing contact with the wall 21 of the manifold at its station.

Since the several modules are identical, only the module 14, illustrated in detail in FIGS. 2 through 7, will be specifically described.

The base of the body block 33 is formed with a cavity 37 which, when the block is in place on the manifold, registers with the passage 26. Said body block base is further formed with straight-through passages 38 and 39 which respectively register with the passages 27 and 28 of the manifold.

The body block 33 is formed with a face 99 against which is mounted, in fluid sealing relation, the face 100 of the double-acting, fluid-actuated, preferably spool-type control valve 40 which, at times, may be referred to herein as "a fluid-actuated device." Said valve 40 may be conventional in operation and is formed with an inlet port 41 which registers with the cavity 37, outlet ports 42 and 43 which register, respectively, with the straight-through passages 38 and 39, and exhaust ports 120 and 121.

The body block 33 is formed to provide a first lateral face 44 against which is mounted a first pilot valve indicated generally by the reference numeral 45. Said pilot valve comprises a casing 46 formed to provide a cylindrical socket 47 and formed, in one face 101 which is arranged in fluid sealing association with the body face 44, with an inlet port 48, a delivery port 49 and an exhaust port 50. As will be seen from an examination of FIGS. 4 and 5, the inlet port 48 is axially spaced above the delivery port 49 and the exhaust port 50 is axially spaced a substantially equal distance below the delivery port 49, and the ports 48 and 50 are preferably laterally or peripherally offset from the delivery port by different distances.

Referring again to FIG. 2, it will be seen that an open passage 51 is formed in the body block 33, leading from the cavity 37 and registering, when the valve 45 is in place on the body block, with the inlet port 48. Said block is further formed with an open passage 52 registering at one end with the delivery port 49 and registering at its opposite end with a first actuator port 54 for the valve 40. A third open passage 53 registers at one end with the exhaust port 50 and leads to exhaust.

A second pilot valve 55, in all respects similar to the valve 45, is mounted sealingly against a second lateral face 102 of the body block 33. A passage 56 in the body block provides open communication between the cavity 37 and the inlet port of the valve 55, a passage 57 provides open communication between the delivery port of the valve 55 and a second actuator port 58 of the valve 40, and a passage 59 connects the exhaust port of the valve 55 with exhaust. Machine screws 60 secure the pilot valves 45 and 55 to the body member 33, and similar fastening means secure the body 33 to the manifold 19 and the valve 40 to the body 33.

Figure 4:
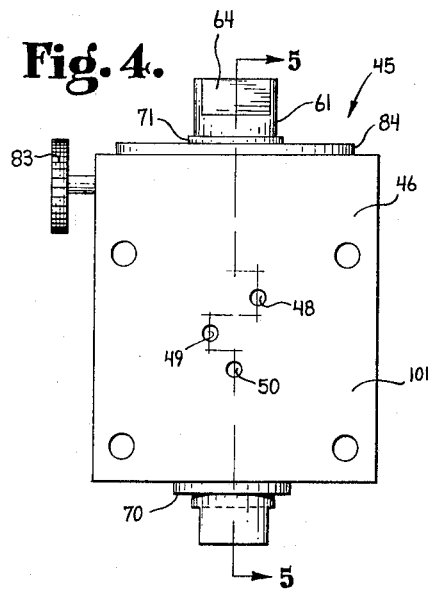
FIG. 4 is an elevational view of a pilot valve forming an element of the present invention.
Figure 5:
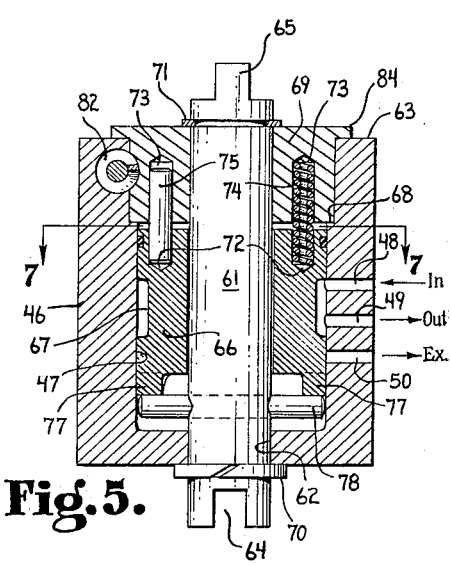
FIG. 5 is a vertical section taken substantially on the line 5—5 of FIG. 4.

As is most clearly illustrated in FIGS. 4 to 6, each pilot valve comprises a rotor 61 journalled in an opening 62 in the bottom of the casing 46 and extending below the bottom wall of said casing and above the upwardly opening mouth or lip 63 of the casing. At its lower exposed end, the rotor 61 is formed with a kerf 64 and at its upper end said rotor is formed with a tongue 65, the parts being so proportioned that the tongue 65 of the rotor of any pilot valve may be cooperatively engaged in the kerf 64 of a superjacent rotor to provide a rotary driving connection therebetween.

A spool type valve member 66 is received in the socket 47 of the casing 46, snugly engaging the cylindrical wall of said socket and centered on the rotor 61 for axial reciprocation and rotational adjstment relative thereto. Said valve member is formed with a peripherally-elongated groove 67 in its cylindrical wall, said groove having an axial height greater than the axial separation between the delivery port 49 and the inlet port 48 or between the delivery port 49 and the exhaust port 50, but less than the axial separation between the inlet port 48 and the exhaust port 50.

Near its upper end, the socket 47 is enlarged to define an upwardly facing shoulder 68 constituting a stop for a plug or timing sleeve 69 which is mounted for rotational adjustment in the upper end of the socket 47. A split ring washer 70 on the lower, exposed end of the rotor 61 holds said rotor against upward movement relative to the casing 46 and a similar washer 71 on the upper exposed end of the rotor holds the same against downward movement relative to the casing and, at the same time, retains the plug 69 in place.

The upper end of the valve member 66 is formed with a peripheral series of equiangularly spaced pockets 72 and the lower end of the plug 69 is formed with a similarly arranged series of pockets 73. Axially compressed coiled springs 74 are confined in alternate registering pockets of the two series to urge the valve member 66 resiliently downwardly; and dowels 75 are snugly received in the remaining registering pockets of the two series to provide a rotational drive connection between the plug 69 and the valve member 66.

The lower end of the valve member 66 is formed to define an annular cammed surface 76 which lies in a single plane perpendicular to the axis of the rotor 61, except for two diametrically opposed axial protuberances 77, 77. The cammed surface of the valve member rides upon, and is supported by, a cam follower 78 fixed to move with the rotor 61. As shown, said cam follower constitutes a hardened steel pin diametrically penetrating the rotor 61 at a point slightly above the floor of the casing socket 47. It will be seen that the attack face 79 of each protuberance 77 is inclined downwardly and in the direction of rotation of the cam follower 78, while the retreat face 80 thereof is sharply axial.

Figure 6:
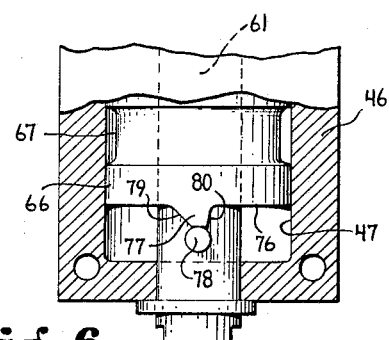
FIG. 6 is a fragmentary view, parts being broken away for clarity of illustration of the cam means provided for pilot valve operation.
Figure 7:
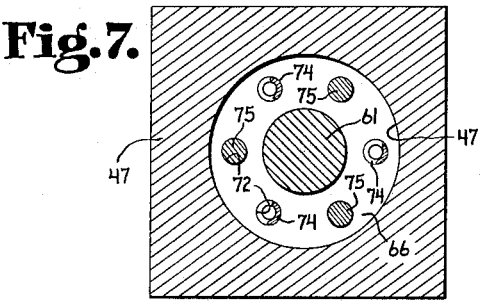
FIG. 7 is a horizontal section taken substantially on the line 7—7 of FIG. 5.

It will be seen that, if the rotor 61 is driven in a counter-clockwise direction as viewed in FIG. 7, the plane, annular cam surface 76 will ride the cam follower 78, under the influence of the springs 74, until the opposite ends of the cam follower simultaneously encounter the attack faces 79 of the two protuberances 77. Since the valve member 66 is held against rotation in the socket 47, the cam follower will coact with the faces 79 to shift the valve member upwardly to its position illustrated in FIGS. 5 and 6. As is clearly shown in FIG. 6, the peripheral extent of the protuberances 77 is very short; and as the ends of the cam follower leave the lower ends of the protuberances, the valve member 66 will snap quickly to its lower position, in which the surface 76 again rides upon the cam follower.

When the cam follower is engaged with the lower ends of the protuberances 77, the groove 67 will span the inlet port 48 and the delivery port 49. When the valve member is in its lower position, the groove 67 will span the delivery port 49 and the exhaust port 50. In the former position of the valve, of course, fluid under pressure will flow from the chamber 25 through the passage 26 into the cavity 37 and thence through the passage 51 to the inlet port 48, through the groove 67 to the delivery port 49 and thence, through the passage 52 to the actuator port of the valve 40 to shift the valve member thereof in one direction. Almost instantaneously thereafter, the protuberances 77 will drop off the follower 78 whereby the groove 67 will move to span the delivery port 49 and the exhaust port 50. Thereby, the actuator port 54 is placed in communication with exhaust through passage 52, delivery port 49, groove 67, exhaust port 50 and passage 52. Thus the valve member of the valve 40 is left in equilibrium with both of its actuator ports 54 and 58 in communication with exhaust. When the valve member of pilot 55 is similarly lifted, actuator port 58 will be similarly placed momentarily in communication with chamber 25, whereby the valve member of valve 40 will be shifted in the opposite direction, after which actuator port 58 is again placed in communication with exhaust. Of course, in either extreme position of the valve member of valve 40, one end of the device 10 will be connected with cavity 37 while the other end of said device will be connected with exhaust port 120 or 121.

As has been explained, the plug or timer sleeve 69 is mounted within the upper end of the socket 47 for rotational adjustment therein and has a rotational driving connection with the valve member 66 through the dowels 75. At a level within the socket 47, the peripheral surface of the plug 69 is formed with a peripherally-extended series of worm teeth 81 with which meshes a worm 82 suitably journalled in the casing 46 and carrying a manually manipulable, knurled head 83 outside the casing 46. It will readily be perceived that, through manipulation of the head 83, the valve member 66 may be turned to any desired degree about the axis of the rotor 61, and that such adjustment may be effected during rotation of the rotor and even during reciprocation of the valve member. Thereby, the point within the cycle of the rotor 61 (and therefore of the machine as a whole) at which any particular valve member 66 will be shifted may be adjustably selected without in any way affecting the corresponding point of actuation of any other pilot valve member in the system.

In the illustrated embodiment of my invention, the plug 69 is formed with a peripheral flange 84 which overlies a portion of the casing lip 63; and the casing is marked with a suitable pointer 85 while the flange 84 is marked with suitable graduations, said pointer and graduations coacting to define a vernier scale or dial whereby the current position of adjustment of the valve member 66 relative to the cam follower 78 may be read. It will be noted that the cam follower 78 has its axis exactly perpendicular to the diametrical extent of the kerf 64 and the tongue 65.

Referring to FIG. 1, it will be seen that the drive shaft 20 is suitably journalled in frame means 87 to extend past the axes of the rotors of the pilot valves 45 and 55 of all of the modules in a given bank. The frame means also provides a journal mounting for a shaft 88 formed with a tongue 89 for engagement in the kerf of the rotor of the pilot valve 55 of the lowermost module 18; and said shaft 88 carries a bevelled gear 90 meshing with a bevelled gear 91 on the shaft 20. Similarly, a shaft 92 journalled in the frame means 87 upon an axis coincident with the common axis of the rotors of the pilot valves 45 of the several modules is provided with a tongue 93 engageable in the kerf of the rotor of the lowermost of said valves 45; and said shaft 92 carries a bevelled gear 94 meshing with a bevelled gear 95 on the shaft 20.

The parts above described are so proportioned and arranged that the diametrical extent of the tongue 89 is perpendicular to the axis of the shaft 20 whenever the diametrical extent of the tongue 93 is perpendicular to said axis. With the tongues 89 and 93 disposed in the positions illustrated in FIG. 1, and with the rotors of the module 18 arranged with their kerfs perpendicular to the plane of the face 36, it will be clear that the module 18 can be slipped into place on the manifold 19 at its station, the tongues 89 and 93 thereby being operatively engaged in the kerfs of the rotors of said module. When the module is now secured in place at its station, the several ports of the module will be properly registered with the passages of the manifold and the rotors of the module will be drivingly connected with the drive shaft 20. In some instances, it may be necessary or desirable to provide suitable gasketing means between the cooperating, fluid sealed faces of the several elements of the combination.

Similarly, it will be appreciated that the remaining modules of the bank may be installed, one by one, on the manifold, each module assuming its proper fluid connections and mechanical drive for its rotors, as it is installed. Now, through the quick coupler means indicated at 31 and 32 in FIG. 2, the flexible conduits 29 and 30 of the several fluid-activated devices 10 will be operatively connected to the passages 27 and 28 of the several modules 12, 13, 14, 16, 17 and 18, leaving the passages 27 and 28 of the module 15 blank or, if desired, suitably plugged. It will be apparent that, as the drive shaft 20 operates, the rotors of the several modules will be driven in unison so that, depending upon the selected positions of rotatable adjustment of the several plugs 69 and valve members 66 of the individual pilot valves, the fluid-actuated devices 10 will be individually actuated in proper sequence.

Should any one of the modules in the bank 11 be found to be timed improperly with respect to the other modules, either or both of its valve members may be accurately adjusted by manipulation of one or both of its knobs 83, without shutting down the machine and without in any way affecting the operation of the remaining modules. Should the module 12, for instance, suffer break-down or malfunction for any reason, the machine may be shut down very briefly while the flexible conduits 29 and 30 of its associated device 10 are disconnected from the module 12 and reconnected to the module 15. The knobs 83 of the module 15 will then be manipulated to bring the vernier scales of its pilot valves precisely to the positions of the vernier scales of the module 12; and thereupon the machine can be restarted, with the module 12 blanked or plugged.

At some later time, when the machine is shut down for a considerable period for some other reason, the tongues of all of the rotors will be moved to the position illustrated in FIG. 1, whereupon the module 12 may be readily removed from the system, without disturbing any other parts of the timer, and either repaired and reinstalled, or replaced by a new module, whereafter the lines 29 and 30 for its associated device 10 may be reconnected in their original position.

Any reasonable number of modules may be mounted upon a single manifold 19 of suitable length. If a machine requires so many modules as to make it impractical to supply them all from a single chamber 25, another bank 96, identical in all respects with the bank 11, may be installed alongside the bank 11 and may be driven from additional bevelled gears 97 and 98 on the shaft 20. The chamber of the manifold of the bank 96 may be connected to the same, or a different, source of fluid under pressure to which the chamber 25 of the manifold 19 is connected.

Figure 8:
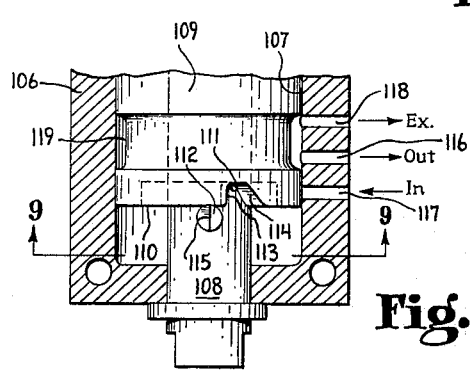
FIG. 8 is a view similar to FIG. 6 but illustrating a modified cam means.
Figure 9:
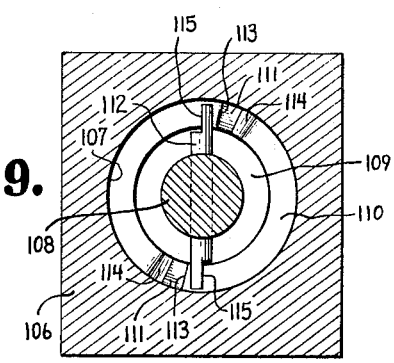
FIG. 9 is a horizontal section taken substantially on the line 9—9 of FIG. 8.

In FIGS. 8 and 9, I have illustrated a different form of cam means through which a rotor may effect reciprocation of a spool type pilot valve member. In those figures, I have shown a casing 106 similar to the casing 46 and formed with a cylindrical socket 107 penetrated by a rotor 108. Received within the socket 107 for reciprocation and for rotational adjustment is a valve member 109 penetrated by the rotor 108 and formed, at its lower end, with an annular, cammed surface 110 interrupted, at diametrically opposed points, by axially extending notches 111, 111. The surface 110 normally rides a cam follower 112 which penetrates, and extends diametrically oppositely from, the rotor 108. In this instance, also, the rotor is designed to rotate in a counter-clockwise direction as illustrated in FIG. 9, and it is desirable for the valve to move downwardly very quickly and to move upwardly more gradually. Therefore, that face 113 of each notch 111 which is first encountered by the cam follower 112 is sharply precipitous, while the face 114 subsequently engaged by the follower is inclined downwardly and more gradually in the direction of follower rotation. To increase the sharpness of downward movement of the valve member 109, each end of the follower 112 may be cut away, as indicated at 115, to define a truly axial surface.

In many applications, this form of actuation is preferable to that shown in FIGS. 6 and 7.

In this instance, the inlet port 117 is downwardly displaced relative to the delivery port 116 and the exhaust port 118 is upwardly displaced relative to said delivery port. The valve member 109 is formed with a peripherally-elongated groove 119 which, in the upper position of the valve member spans the delivery port 116 and the exhaust port 118 and, in the lower position of the valve member, spans the delivery port 116 and the inlet port 117.

I claim as my invention:

1. For use with a fluid-actuated device having a first port and a second port, timed pilot valve means for controlling fluid flow to and from said ports comprising a first pilot valve including a portless rotor and shiftable means concentric with and non-rotatably driven by said rotor between a position connecting said first port with a source of fluid under pressure and a position connecting said first port with exhaust, and means operable during rotation of said rotor to adjust the phase relation of said shiftable means to said rotor by rotative adjustment of said shiftable means about the axis of said rotor, a second pilot valve including a second portless rotor and second shiftable means concentric with and non-rotatably driven by said second rotor between a position connecting said second port with a source of fluid under pressure and a position connecting said second port with exhaust, and means operable during rotation of said second rotor to adjust the phase relation of said second shiftable means to said second rotor by rotative adjustment of said second shiftable means about the axis of said second rotor, and means for driving said rotors at a fixed ratio of angular velocities.

2. A timer unit comprising a body block, a fluid-actuated device mounted on said block and having a first port and a second port, a first pilot valve casing mounted on said block, and a second pilot valve casing mounted on said block, said body block being formed with a cavity in open communication with a source of fluid under pressure, said first pilot valve casing being provided with a first inlet port, a first delivery port and a first exhaust port, said second pilot valve casing being provided with a second inlet port, a second delivery port and a second exhaust port, said body block being formed with an open passage connecting said cavity with said first inlet port, an open passage connecting said first delivery port with said first port, and an open passage connecting said first exhaust port with exhaust, and said body block further being formed with an open passage connecting said cavity with said second inlet port, an open passage connecting said second delivery port with said second port, and an open passage connecting said second exhaust port with exhaust, a first rotor journalled for rotation in said first casing, a first spool valve body received in said first casing for coaxial rotational adjustment and for axial reciprocation relative to said first rotor between a position establishing communication between said first delivery port and said first exhaust port and a position establishing communication between said first delivery port and said first inlet port, cooperating cam means on said first rotor and said first valve body for causing reciprocation of said first valve body upon rotation of said first rotor, a second rotor journalled for rotation in said second casing, a second spool valve body received in said second casing for coaxial rotational adjustment and for axial reciprocation relative to said second rotor between a position establishing communication between said second delivery port and said second exhaust port and a position establishing communication between said second delivery port and said second inlet port, cooperating cam means on said second rotor and said second valve body for causing reciprocation of said second valve body upon rotation of said second rotor, means for independently rotationally adjusting said respective valve bodies during rotation of said rotors, said cooperating cam means being so constructed and arranged that such rotational adjustment of either valve body alters the phase relationship between reciprocation of that valve body and the rotational position of its associated rotor, and means for driving said rotors at a fixed ratio of angular velocities.

3. Timer mechanism for a plurality of fluid-actuated devices, said timer mechanism comprising a plurality of substantially identical modules, each module comprising body means formed to provide a cavity, a fluid-actuated device mounted on said body means, and valve mechanism mounted on said body means, said valve mechnism including a portless rotor mounted for rotation on an axis and having a kerf at one exposed end and a tongue at its other exposed end, and further including a reciprocating valve member concentric with said rotor, cooperating cam means on said valve member and said rotor effective upon rotation of said rotor to cause reciprocation of said valve member to establish intermittant communication between said cavity and said fluid-actuated device, means manipulable during rotation of said rotor for turning said valve member about the axis of said rotor to alter the phase relation between the elements of said cam means, said plurality of modules being arranged in a series extending generally in the direction of said axis with the cavities of all of said modules in open communication with a common source of fluid under pressure and with the kerf of the rotor of each module save one operatively receiving the tongue of the rotor of the next adjacent module, and means operatively connected to one of said rotors to drive all of said rotors in unison.

4. The mechanism of claim 3 in which each fluid-actuated device is double-acting, a separate valve mechanism is provided for each end of said device, and each valve member normally connects its end of said device with exhaust and connects the same intermittently with said cavity only momentarily.

5. The combination with a plurality of fluid-actuated devices, of timer mechanism therefor comprising a manifold having a chamber in open communication with a source of fluid under pressure, said manifold being formed to provide a number of stations exceeding the number of said fluid-actuated devices, said manifold at each such station being provided with an open passage communicating with said chamber and opening through a first wall of said manifold and with two open passages opening through said first wall and through a second wall of said manifold, a pair of flexible conduits leading respectively from the opposite ends of each fluid-actuated device, the conduits of each such pair being respectively connected, at said second wall, to said two open passages of a selected station, and a timer module at each such station, each timer module comprising a body block formed with a face removably mounted in fluid sealing contact with said first manifold wall and formed with a cavity registering with said first manifold passage and with two straight-through passages registering respectively with said two open manifold passages, a double-acting, fluid-actuated control valve mounted on said block opposite said face and having ports registering respectively with said two straight-through passages, said control valve further having a first actuating port and a second actuating port, a first pilot valve mounted on said block, a second pilot valve mounted on said block, said first pilot valve being provided with a first inlet port, a first delivery port and a first exhaust port, said second pilot valve being provided with a second inlet port, a second delivery port and a second exhaust port, said body block being formed with an open passage connecting said cavity with said first inlet port, an open passage connecting said first delivery port with said first actuating port, and an open passage connecting said first exhaust port with exhaust, and said body block further being formed with an open passage connecting said cavity with said second inlet port, an open passage connecting said second delivery port with said second actuating port, and an open passage connecting said second exhaust port with exhaust, and common drive means for all of said pilot valves to shift the same, in predetermined sequence, between a position establishing communication between their delivery ports and their exhaust ports and a position establishing communication between their delivery ports and their inlet ports.

6. The combination of claim 5 including means associated with each pilot valve for independently adjusting its phase relation to all of the other pilot valves during operation of the timer mechanism.

7. Timer mechanism for a plurality of fluid-actuated devices, said timer mechanism comprising a plurality of substantially identical modules, each module comprising body means formed to provide a cavity, a fluid-actuated device mounted on said body means and having an actuator port, and valve mechanism mounted on said body means, said valve mechanism comprising a casing having a cylindrical socket provided in a peripheral wall thereof with a delivery port, an inlet port axially offset in one direction from said delivery port, and an exhaust port axially offset in the opposite direction from said delivery port, a cylindrical valve member snugly received in said socket and formed in its periphery with a peripherally elongated groove having an axial extent greater than the axial distance between said delivery port and either of said inlet and exhaust ports but less than the axial distance between said inlet port and said exhaust port, one axial surface of said valve member being cammed, a rotor journalled in said casing and having a kerf at one exposed end and a tongue at its other exposed end, said rotor axially penetrating said valve member and being provided with cam follower means operatively bearing upon said cammed surface, a plug coaxially seated in said socket and spaced from said valve member in the direction away from said cammed surface, said plug being axially penetrated by said rotor, spring means confined between said plug and said valve member and resiliently urging said valve member toward said cam follower means, means cooperatively engaged with said plug and with said valve member and providing a rotational drive connection therebetween, and means accessible from outside said casing and operatively engaged with said plug for turning said plug about the axis of said rotor, said cammed surface and cam follower being proportioned and arranged normally to position said groove in spanning relation with said delivery port and said exhaust port and momentarily to position said groove in spanning relation with said delivery port and said inlet port upon rotation of said rotor, said body means being formed to provide an open passage establishing communication between said cavity and said inlet port, an open passage establishing communication between said delivery port and said actuator port, and an open passage establishing communication between said exhaust port and exhaust, said plurality of modules being arranged in a series extending generally in the direction of said rotor axis with the cavities of all of said modules in open communication with a common source of fluid under pressure and with the kerf of the rotor of each module save one operatively receiving the tongue of the rotor of the next adjacent module, and means operatively connected to one of said rotors to drive all of said rotors in unison.

8. Pilot valve mechanism comprising a casing having a cylindrical socket provided in a peripheral wall thereof with a delivery port, an inlet port axially offset in one direction from said delivery port, and an exhaust port axially offset in the opposite direction from said delivery port, a cylindrical valve member snugly received in said socket and formed in its periphery with a peripherally elongated groove having an axial extent greater than the axial distance between said delivery port and either of said inlet and exhaust ports but less than the axial distance between said inlet port and said exhaust port, one axial surface of said valve member being cammed, a rotor journalled in said casing, axially penetrating said valve member and provided with cam follower means operatively bearing upon said cammed surface, a plug coaxially seated in said socket and spaced from said valve member in the direction away from said cammed surface, said plug being axially penetrating by said rotor, spring means confined between said plug and said valve member and resiliently urging said valve member toward said cam follower means, means cooperatively engaged with said plug and with said valve member and providing a rotational drive connection therebetween, and means accessible from outside said casing and operatively engaged with said plug for turning said plug about the axis of said rotor, said cammed surface and cam follower being proportioned and arranged normally to position said groove in spanning relation with said delivery port and said exhaust port and momentarily to position said groove in spanning relation with said delivery port and said inlet port upon rotation of said rotor.

9. The pilot valve mechanism of claim 8 in which said cammed surface is an annular surface at one end of said valve member and is disposed in a single plane perpendicular to said rotor axis except for two diametrically opposed axial protuberances of narrow peripheral extent, and said cam follower means is a pin diametrically penetrating said rotor, projecting radially oppositely therefrom and bearing upon said cammed surface.

10. The pilot valve mechanism of claim 8 in which said cammed surface is an annular surface at one end of said valve member and is disposed in a single plane perpendicular to said rotor axis except for two diametrically opposed axial notches of narrow peripheral extent, and said cam follower means is a pin diametrically pentrating said rotor, projecting radially oppositely therefrom and bearing upon said cammed surface.

11. The pilot valve mechanism of claim 8 in which said plug and said valve member are formed, in their adjacent ends, with a plurality of registering, peripherally-spaced pockets, alternate registering pairs of said pockets receiving the opposite ends of axially-compressed coiled springs constituting said spring means, and the remaining registering pairs of said pockets snugly receiving the opposite ends of dowels constituting said rotational drive connection.

12. The pilot valve mechanism of claim 11 in which said plug is received in an open end of said casing and carries peripheral flange means overlying said casing end, said flange means and said casing end being provided with cooperating markings constituting a vernier dial, and in which said means for turning said plug comprises a manually manipulable worm journalled in said casing and meshing with worm gear means fixed relative to said plug.

13. The pilot valve mechanism of claim 8 in which said plug is received in an open end of said casing and carries peripheral flange means overlying said casing end, said flange means and said casing end being provided with cooperating markings constituting a vernier dial, and in which said means for turning said plug comprises a manually manipulable worm journalled in said casing and meshing with worm gear means fixed relative to said plug.

References Cited by the Examiner

UNITED STATES PATENTS

| 2,821,434 | 1/1958 | Hunter | 137—624.13 X |
| 2,837,118 | 6/1958 | Allen | 137—624.7 X |
| 3,098,505 | 7/1963 | Zappia | 137—625.6 X |
| 3,111,139 | 11/1963 | Beckett | 251—367 X |
| 3,215,158 | 11/1965 | Bass | 137—625.69 X |

WILLIAM F. O'DEA, *Primary Examiner.*

A. COHAN, *Examiner.*

UNITED STATES PATENT OFFICE
CERTIFICATE OF CORRECTION

Patent No. 3,273,593                         September 20, 1966

Charles W. Kinsley

It is hereby certified that error appears in the above numbered patent requiring correction and that the said Letters Patent should read as corrected below.

Column 10, line 8, for "penertating" read -- penetrated --.

Signed and sealed this 22nd day of August 1967.

(SEAL)
Attest:

ERNEST W. SWIDER                          EDWARD J. BRENNER
Attesting Officer                            Commissioner of Patents